MITCHELL & SEARCH

Seed-Planter.

No. 67,444.   Patented Aug. 6. 1867.

Witnesses:
N B Smith
J Thompson

Inventor:
H S Mitchell & C Search
by their Attorney
A M Smith

United States Patent Office.

H. S. MITCHELL AND CHARLES SEARCH, OF HUBLERSBURG, PENNSYLVANIA.

*Letters Patent No. 67,444, dated August 6, 1867.*

IMPROVEMENT IN CORN-PLANTERS.

*The Schedule referred to in these Letters Patent and making part of the same.*

TO ALL WHOM IT MAY CONCERN:

Be it known that we, H. S. MITCHELL and C. SEARCH, of Hublersburg, Centre county, and State of Pennsylvania, have invented certain new and useful Improvements in Corn-Planters; and we do hereby declare the following to be a full, clear, and exact description of the same, reference being had to the accompanying drawings, making part of this specification, in which—

The same letters of reference denote corresponding parts in all the figures.

Our invention consists in the employment, in connection with the reciprocating seed-slide, of a removable plate or centre in such manner as that, by the removal of one plate, and the substitution of another, provided with a different number of or different-sized perforations, the distance between the hills, or the number of grains deposited therein, may be varied and regulated as hereinafter described.

It further consists in providing the removable plate with a central rib or ridge matching and working in a corresponding groove in the partition between the corn and fertilizer hoppers.

It further consists in an arrangement of levers and rack-bar, in connection with the coverers, whereby said coverers may be adjusted and regulated while the machine is in motion, for the purpose of adapting them to the character of the ground over which the machine is passing, as hereinafter explained; and It further consists in the employment of a reciprocating rod, attached to and operated by the slide, and provided with a star-shaped burr or head for agitating the plaster or other fertilizer, as hereinafter explained.

To enable others to understand and use our invention, we will proceed to describe it with reference to the drawings, in which—

Figure 1:
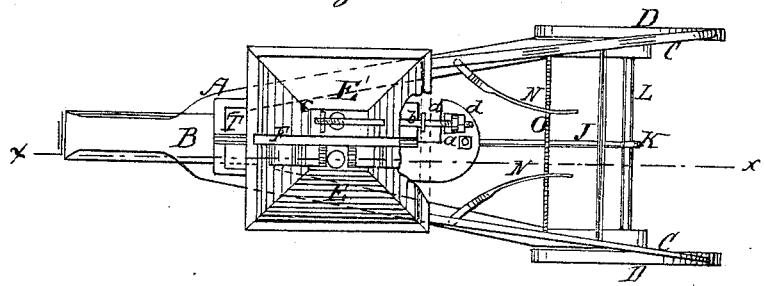
Figure 1 represents a plan or top view of a corn-planter embracing our improvements.
Figure 2:
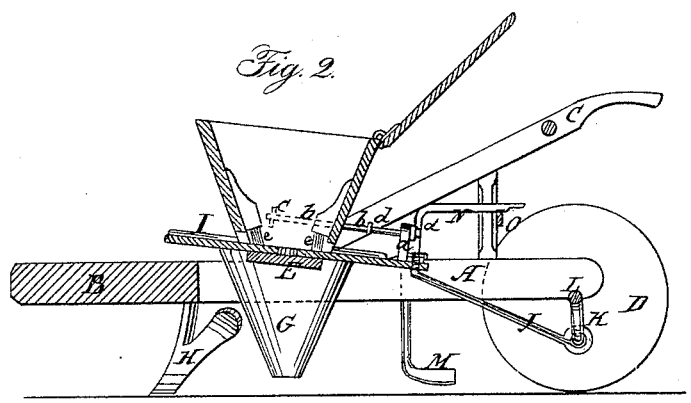
Figure 2 is a longitudinal section of the same, taken in the line $x$ $x$, fig. 1.
Figure 3:
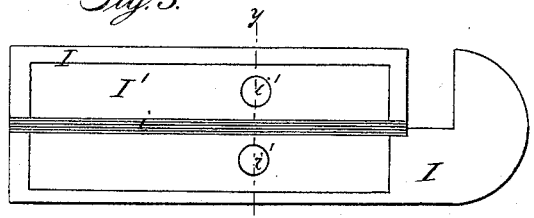
Figure 3 is a plan view of the reciprocating slide detached.
Figure 4:
Figure 4 is a transverse section through the slide, taken in line $y$ $y$, fig. 3.

A represents a main frame, which may be made triangular in form, as shown by the drawing, or in any other desired or convenient form. B is the beam to which the draught is attached. C C, the handles by which the machine is controlled in its movement over the ground. D D, the carrying and driving-wheels. E E', the corn and fertilizer hoppers, separated by a partition, F. G, the seed or corn "run," and H the drill-tooth. The parts above named may be constructed in any usual or convenient manner. I is a reciprocating slide, operated through the medium of pitman or connecting-rod J, which is driven by a crank, K, formed on or attached to the main axle L of the driving-wheel or wheels D, either or both of which may be made to operate the crank, as preferred. I' is a removable plate let into the slide I in the manner shown in figs. 3 and 4, and is provided with a central longitudinal rib or flange $i$, which may be extended beyond the ends of the plate, so as to rest upon the ends of the slide or slide-frame I, to prevent the plate dropping below the face thereof, and the sides and ends of the plate and of the socket in the slide may be made flaring, as shown in fig. 4, for the same purpose, and for the further purpose of facilitating the removal of the plate when it is desired to substitute another therefor. The rib $i$ is made to fit and work back and forth in a groove of corresponding shape in the bottom of the partition F, between the grain and fertilizer-hoppers, in such manner as to effectually prevent the mingling of the contents of said hoppers. The slide-plate I' is provided with perforations $i'$ $i'$, one or more on each side of the rib $i$, and of any desired size; or the machine may be provided with any desired number of exchangeable slide-plates, provided with different sized or different numbers of perforations, to adapt the machine to deposit a greater or less number of grains, or to increase or diminish the distance between the hills, as desired. $E^2$ is the stationary bottom of the hoppers E E', over which the slide works, and upon the opposite sides of which the corn and plaster are discharged at regular intervals by the reciprocation of the perforated slide and slide-plate. $e$ $e$ are brushes or "strikers," of any usual construction, which prevent the escape, with the movement of the slide, of more than the desired number of grains which the slide is adapted to discharge. $a$ is a standard or lug, attached to the rear end of the slide I, to which is connected the rear end of a rod, $b$, which passes through a perforation in the fertilizer-hopper, and is provided at its forward end with a star-shaped head or burr, $c$, which, by the reciprocation of the slide, is caused to move back and forth through the contents of the hopper, thereby keeping said contents in agitation, and enforcing a regular and constant delivery thereof with the discharge of the grain. The extent of throw of the burr or head $c$ may be regulated by varying the distance between the nuts or flanges $d\ d$ on the rod $b$, between which the standard may move without operating the rod  M M are the followers or coverers, which may be made in any desired form, and which are arranged one on each side of the furrow formed by the drill-tooth H. Said coverers are attached to the lower end of a vertical shank, which has its bearings in the frame A, and which is provided with a lever, N, by which the angle of the coverers to the furrow may be regulated so as to throw more or less of the earth from either or both sides into the furrow, according to the character of the soil or the nature of the surface of the ground over which the machine is passing, whether level or on the side hill, as desired. O is a rack-bar, over which the rear ends of the levers work, and which serves to hold the levers, and consequently the coverers themselves, at any desired angle at which they may be set or adjusted.

The operation of the machine will be readily understood from the foregoing description without further explanation.

What we claim as our invention, and desire to secure by Letters Patent, is—

1. The removable slide-plate, applied to and operating in connection with the reciprocating slide, substantially as and for the purpose described.

2. The removable slide-plate I', provided with the rib or ridge $i$, arranged to work in a corresponding groove formed in the partition F, in the manner and for the purpose set forth.

3. The arrangement of the levers N and rack-bar O, in connection with the adjustable followers or coverers, substantially as described.

4. The reciprocating rod $b$, provided with the star-shaped burr or head $c$, and operated by the reciprocating slide I, in the manner and for the purpose described.

In testimony whereof we have hereunto subscribed our names this 26th day of June, 1867.

H. S. MITCHELL,
CHAS. SEARCH.

Witnesses:
J. E. LONG,
E. L. BERGSTRESSER.